Oct. 19, 1965  E. S. JOLINE  3,213,416
VEHICLE HEADING INDICATOR
Filed Jan. 10, 1961  3 Sheets-Sheet 1

INVENTOR.
EVERETT S. JOLINE
BY
ATTORNEY

Oct. 19, 1965 E. S. JOLINE 3,213,416

VEHICLE HEADING INDICATOR

Filed Jan. 10, 1961 3 Sheets-Sheet 2

INVENTOR.
EVERETT S. JOLINE
BY
ATTORNEY

Oct. 19, 1965   E. S. JOLINE   3,213,416

VEHICLE HEADING INDICATOR

Filed Jan. 10, 1961   3 Sheets-Sheet 3

INVENTOR.
EVERETT S. JOLINE
BY

ATTORNEY

United States Patent Office 3,213,416
Patented Oct. 19, 1965

3,213,416
VEHICLE HEADING INDICATOR
Everett S. Joline, Huntington Station, N.Y., assignor to Sperry Rand Corporation, Great Neck, N.Y., a corporation of Delaware
Filed Jan. 10, 1961, Ser. No. 81,732
12 Claims. (Cl. 340—27)

The present invention relates generally to indicating devices and more particularly to an improved form of heading indicator.

There are, presently, two generally accepted techniques for displaying the heading of a craft: the first of these, known as the inside-out display technique, is usually preferred and utilizes a fixed pointer and a movable scale, usually in the form of a rotatable ring. As the vehicle whose heading is to be displayed changes its course, the ring rotates in proportion to the course change, so that the pointer always indicates the craft true heading. While relatively steady, or long term, heading conditions are easily interpreted for an indicator employing this technique, i.e. the heading of the craft is always displayed at the same point on the indicator, information as to the direction to which the craft is changing its heading, i.e. short term information, is difficult to interpret because the ring rotates in a direction which is counter to the direction that the viewer would expect. For example, a right turn of the vehicle cause the ring to rotate to the left, i.e. to rotate counterclockwise, to indicate correctly the vehicle heading. Such movement of the indicator scale tends to confuse the viewer and results in a decrease in his sense of orientation. The second display technique, known as the outside-in technique, utilizes a fixed scale and a movable pointer, e.g. a dial and a rotatable pointer. Steady heading conditions are more difficult to interpret on an outside-in type display than on an inside-out type display because different craft headings are never displayed at the same place on the indicator. However, outside-in type indicators present reliable, easily interpreted information as to the direction to which a vehicle is turning, i.e. short term information, when, for example, the dial indication of North is on the top side of the dial and the vehicle heading is generally northerly. Then, a right turn of the vehicle will cause the pointer to turn to the right and a left turn will cause the pointer to turn to the left. However, even outside-in type indications are difficult to interpret when the vehicle heads in a generally southerly direction because, then, a vehicle right turn will cause the pointer to turn to the left and vice versa.

Apparatus embodying the present invention combines the desirable features of both the outside-in and inside-out type displays by utilizing a rotatable ring and a rotatable pointer. Generally, a presently preferred form of the invention utilizes two servos, a ring servo and a fast response pointer servo, each of which is driven by the same heading error signal but only one of which, the ring servo, provides a feedback signal to cancel the heading error signal. In the absence of a signal representing a heading change, the two servos are at rest and the pointer is aligned with a reference position and points to indicia on the ring representing the vehicle heading. When the vehicle heading is changed, an error signal is produced to which the pointer servo immediately responds and drives the pointer in the direction of turn to indicate on the ring the new vehicle heading. Eventually, however, the error signal causes the slower responding ring servo to drive the ring in a direction opposite to that of the pointer, thereby producing a feedback signal which operates to cancel the heading error signal and return the pointer to its reference position. With a constant rate of turn of the vehicle, the pointer hangs off from its reference position in proportion to the vehicle turn rate since the ring servo cannot follow exactly the changing heading. As soon, however, as the turn rate goes to zero, the pointer goes back to its reference position, as described above, with the ring indicia representing the craft heading gradually coming into alignment with that reference position. By making the ring servo relatively sluggish, only signals representing relatively steady, i.e. long term, heading information operate to drive the ring. The pointer servo, on the other hand, though it can be driven by signals representing either long or short term heading information, responds only to short term heading signals because the ring servo cancels all error signals produced by long term heading changes as they are developed.

A principal object of the invention is to provide an indicator having a reference and a pointer, each of which is positionable respectively in response to signals representing long and short term information.

Another object of the invention is to provide a single indicator usable both as a heading indicator and as a turn and bank indicator.

Another object of the invention is to provide a simple heading indicator which may be set for a desired heading.

The invention will be described with reference to the figures wherein.

Figure 1:
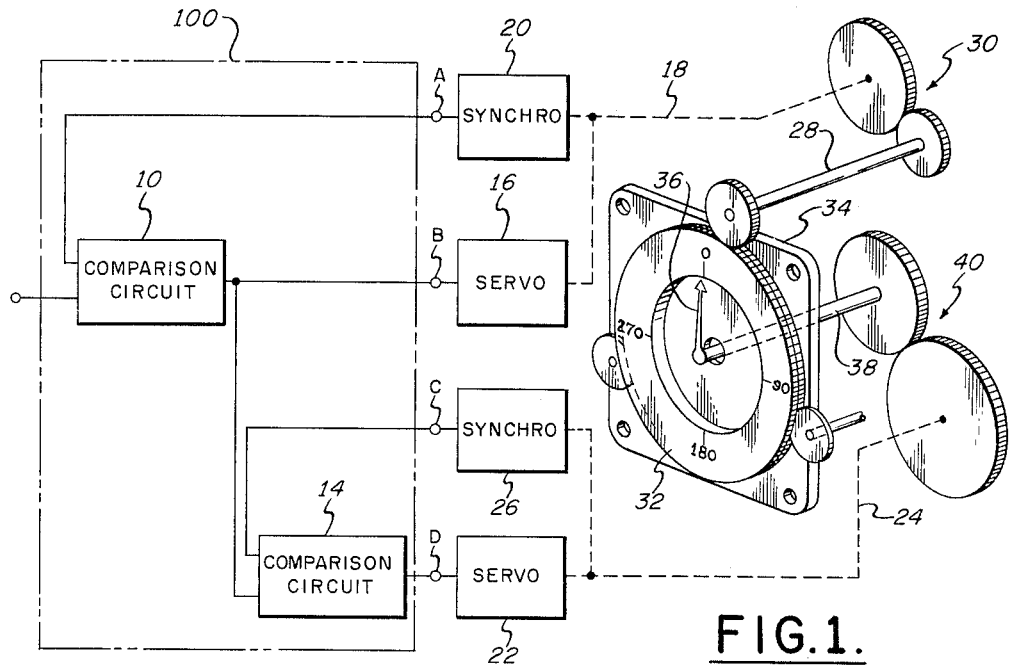
FIG. 1 is a block diagram of apparatus embodying the invention.
Figure 4:
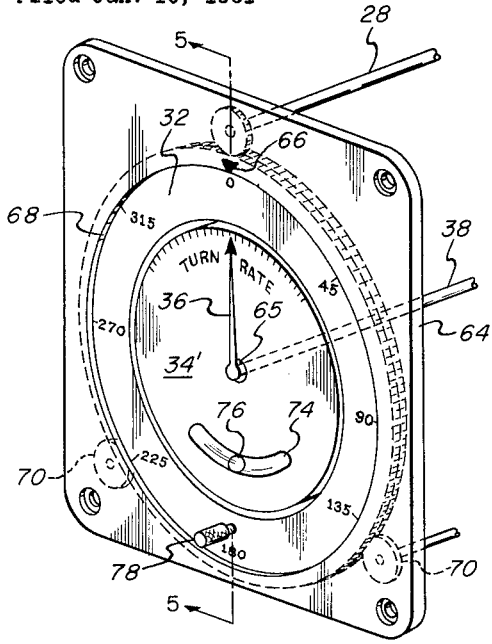
FIG. 4 is a perspective view of a presently preferred indicator.
Figure 5:
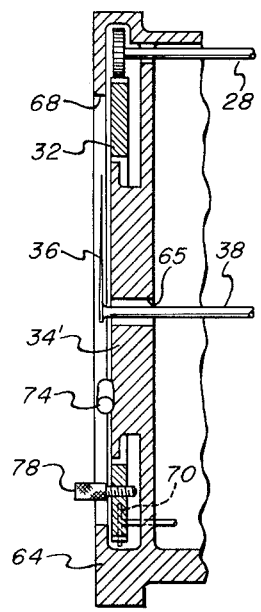
Figure 6:
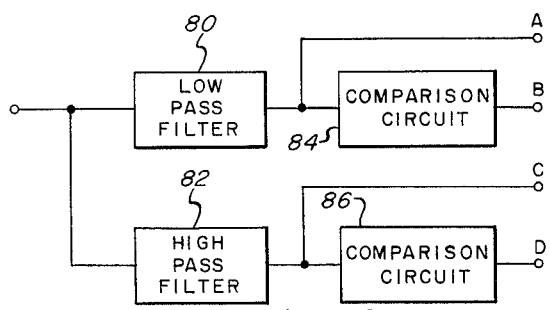
Figure 7A:
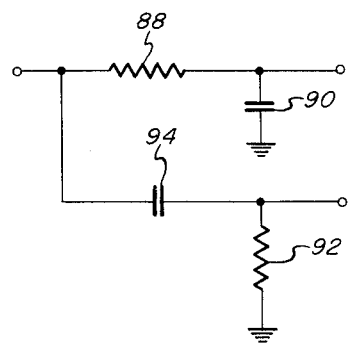
Figure 7B:
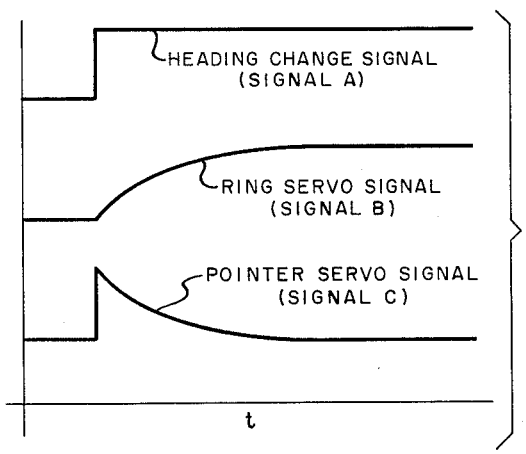
Figure 8:
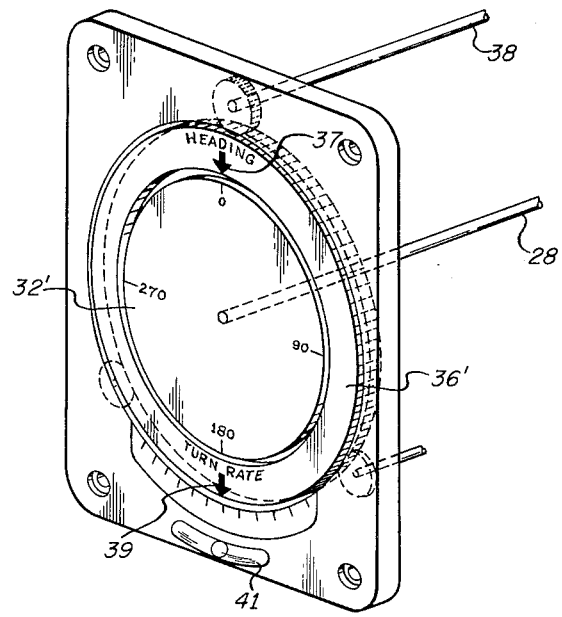
Figure 9:
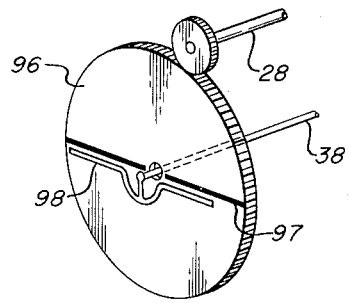
Figure 10A:
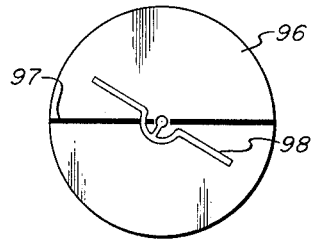
Figure 10B:
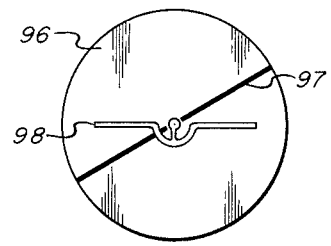

FIG. 5 is a sectional view, taken along line 5—5, of the indicator shown in FIG. 4, FIG. 6 is a block diagram which, when substituted for a portion of FIG. 1, provides another embodiment of the invention, FIGS. 7a and 7b are figures useful in describing the operation of the apparatus shown in FIG. 6, FIG. 8 shows another indicator usable by apparatus embodying the invention, FIG. 9 is a perspective view of a horizon indicator usable with apparatus embodying the invention, and FIGS. 10a and 10b are illustrations useful in describing the operation of the indicator shown in FIG. 9.

Referring to FIG. 1, a comparison circuit 10, adapted to receive a signal representing the heading of a craft, applies its output signal to a slow response position servo 16 and a comparison circuit 14, the servo 16 having an output shaft 18. A synchro 20, mechanically driven by the shaft 18, converts the rotation of the shaft 18 to a representative electrical feedback signal which is applied to the comparison circuit 10. The comparison circuit 14 output signal is applied to a position servo 22. Mechanically connected to and driven by the servo output shaft 24 is a synchro 26, the output signal of which is applied as a feedback signal to the comparison circuit 14 and represents the amount that the shaft 24 has rotated. A shaft 28, connected through gearing 30 to the shaft 18, operates to rotate a ring member 32 having a face marked with indicia representing heading. The ring 32 rotates about a fixed member 34 having an axial hole through which a shaft 38 extends. A pointer 36 is secured to the shaft 38 which is, in turn, driven through gearing 40 by the shaft 24.

With the craft in which the invention is being employed moving due north, the pointer 36 points, as shown, to a heading of zero degrees on the ring 32. A craft right turn to, for example, a heading of 90 degrees, produces a new heading signal which, when compared with the feedback signal from the synchro 20, produces a heading error signal. The heading error signal is then applied to the servo 16 and to the comparison circuit 14. The comparison circuit 14 applies its output signal to the servo 22 which operates to rotate immediately the pointer 36 clockwise, i.e. to the right, looking at the indicator face, toward an indication of 90 degrees. At the same time, the servo 16 drives the ring 32 slowly to the left, thereby eventually bringing the ring indicia representing 90 degrees to the top, or reference position, of the indicator. As the ring 32 rotates, a feedback signal is provided by the synchro 20 which cancels the heading error signal and causes the pointer 36 to retreat gradually to the reference position. Since the pointer 36 is rotated in proportion to the error between a signal representing the craft heading and a signal representing the amount that the ring 32 has rotated from the reference position, the pointer always points to the ring indicia representing the true vehicle heading. As is intended by the present invention, the pointer 36 rotates in accordance with the direction that the vehicle turns and returns to the reference position when a new heading is assumed, thereby facilitating the interpretation of relatively steady heading conditions. If the vehicle turns steadily, the pointer will hang off from its reference position in proportion to the turn rate and the ring will rotate constantly until the turn rate becomes zero. For example, during a craft turn of constant rate, a constant error signal is applied to the servo 22 which causes the pointer to hang off from the reference position by a fixed amount.

Figure 2:
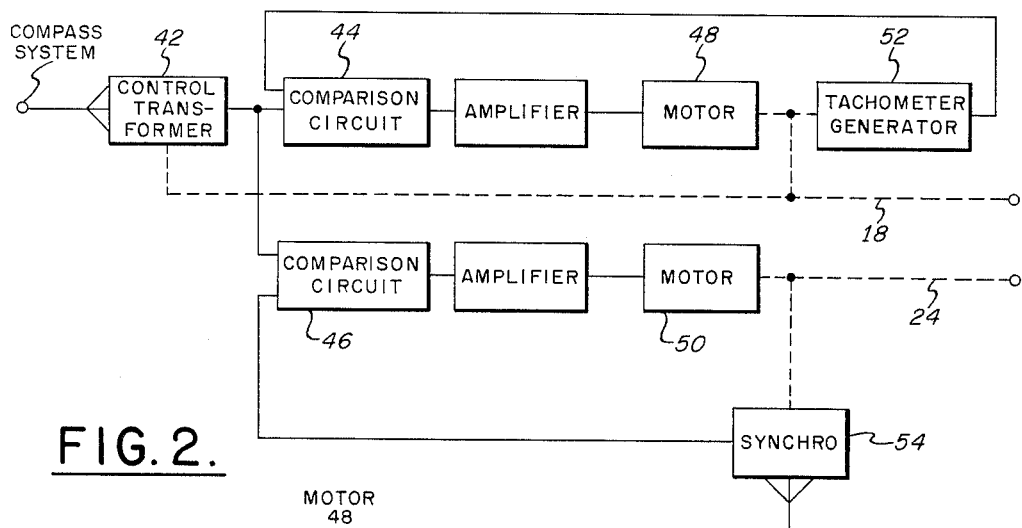
FIG. 2 is a block diagram of a presently preferred form of the invention.

In FIG. 2, a presently preferred form of the invention, adapted to receive a signal representing the heading of the craft from a synchro pick-off on a gyromagnetic compass, has a control transformer 42 which receives the heading signal. The control transformer 42 (performing a function equivalent to the function of the comparison circuit 10 of FIG. 1) applies its output signal to two comparison circuits 44 and 46, each of which applies its output signal to a motor, respectively motors 48 and 50. The motor 48 drives the shaft 18 and a tachometer generator 52 which operates to damp the operation of the motor 48 by feeding back a rate signal to the comparison circuit 44. The rotor of the control transformer 42 is also driven by the motor 48 to cancel the heading error signal at the output of the control transformer 42. A synchro 54, driven by the motor 50, converts the shaft rotation of that motor to a representative electrical feedback signal which is applied to the comparison circuit 46. Like the apparatus of FIG. 1, the shafts 18 and 24 connect respectively to drive the ring and pointer of a heading indicator. The operation of the apparatus of FIG. 2 differs from that of FIG. 1 only in that the FIG. 2 ring servo is made sluggish by a tachometer generator and cancelling of the heading error is by mechanical feedback to a control transformer.

Figure 3:
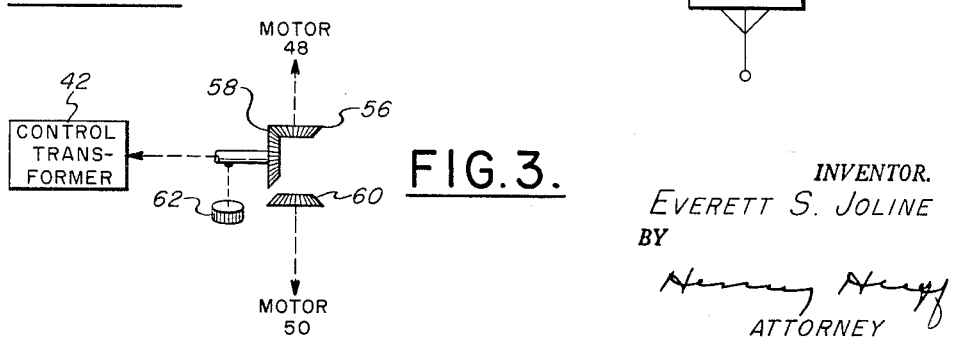
FIG. 3 is a drawing useful in describing a feature of the invention.

Both the apparatus of FIG. 1 and the apparatus of FIG. 2 may be readily made redundant, i.e. capable of providing a true heading indication even if one of the servos fails to operate, simply by permitting the heading error signal to be cancelled by a selectable feedback signal from either the ring servo or the pointer servo. Then, under normal operation, or if the pointer servo fails, the ring servo would provide the feedback signal. Correspondingly, if the ring servo fails, the pointer servo could provide the feedback signal. Referring to FIG. 3, a simple technique for making the feedback to the control transformer 42 of FIG. 2 selectable, uses a first bevel gear 56 which is driven by the motor 48 and which is meshed with a gear 58. Under normal operation, feedback to the control transformer 42 is through the gears 56 and 58. In the event the pointer servo fails, feedback is still through gears 56 and 58. However, in this case, the vehicle heading is displayed inside-out, i.e. only the ring rotates. A gear 60, also meshable with the gear 58, is driven by the motor 50. The gear 58 may be taken out of engagement with the gear 56 and brought into engagement with the gear 60 by means of a knob 62. In the event the ring servo fails, the gear 58 is brought into engagement with the gear 60, thereby providing feedback to the control transformer 42 and providing an outside-in type heading display, i.e. only the pointer moves. While the pointer and ring are driven in opposite directions by heading error signal, the feedback to the control transformer 42 is always of the correct phase since the gear 58 will always rotate in one direction, regardless of whether it is meshed with gear 56 or 60, for a heading change of a particular sense.

Referring to FIGS. 4 and 5, a presently preferred indicator useable with apparatus embodying the invention has a fixed member 64 having a reference mark 66 at the top of the indicator. A circular central portion 34' of the member 64 is provided with indicia representing turn rate and an axial hole 65 through which the shaft 38 extends. The ring 32 on which the heading indicia is located, is secured coaxially with the hole 65 to the fixed member 64 by a lip 68 and roller 70. The ring 32 is driven through gearing by the shaft 28. Secured to the indicator central portion 34' is a curved tubular glass enclosure 72 having an agate 76 in it. A knurled member 78 which may be brought into contact with the fixed member 64, is screwably retained in the ring 32. In operation, the ring 32 and pointer 36 perform as described earlier with the pointer always pointing to ring indicia representing the craft true heading. However, since, as was earlier described, the pointer hangs off from its reference position by an amount proportional to the craft turn rate during steady turns, the pointer, in cooperation with the agate 76 and enclosure 74, can provide a turn and bank indication for the performance of coordinated turns, turn rate being read from the scale on the member 34' and bank being determined by the agate position within its enclosure. In addition, the indicator of FIG. 4 can operate in a heading select mode. For example, if a heading 135° is desired, the knurled member 78 is used to rotate the ring 32 until 135° on the ring 32 is lined up with the references 66. Then the member 78 is screwed against the fixed member 64. This holds the ring in place and causes the pointer to rotate to indicia representing the craft true heading. Only when the pointer 36 is aligned with the reference 66 will the craft be moving along the selected course. In another specie of the invention, the ring servo is disabled by a switch, with the ring then being rotated manually to bring the desired heading indicia into alignment with the reference.

The apparatus of FIG. 6, when connected to the points A, B, C and D of FIG. 1, in place of the apparatus designated generally by the numeral 100, provides a different embodiment of the invention. In FIG. 6, a low pass filter 80, e.g. the single resistance capacitance filter shown and described in Radiotron Designer's Handbook, Wireless Press Publishers, 1953, page 174, FIG. 4.37, and a high pass filter 82, e.g. the simple resistance capacitance filter shown and described on page 183, FIG. 4.35A, of that publication, are connected in parallel and have a signal representing the heading of the craft applied simultaneously to them. Therefore, when the craft heading is changed, both filters see a signal representing the changing heading, with the low pass filter passing all Fourier components of the heading change signal below a cutoff frequency and the high pass filter passing all Fourier components above a cutoff frequency. The output signals from the low pass and high pass filters are then applied respectively to comparison circuits 84 and 86 which also receive feedback signals respectively from the synchros 20 and 26. The ring 32, therefore, rotates in response to only low frequency, i.e. long term, signals and the pointer rotates in response to only high frequency, i.e. short term, signals. If the time constants of the two filters are made equal, the pointer and ring will rotate so that the pointer always points to the ring indicia representing the true craft heading. For example, in FIG. 7a, a resistor 88 and a capacitor 90 form a simple low pass filter and a resistor 92 and a capacitor 94 form a simple high pass filter, the filters being connected in parallel with each other. With the time constants of both filters the same and with a step heading change input signal, signal A, FIG. 7b (theoretically impossible to produce because no craft can change its course that abruptly) applied to both filters, the output signals from the low and high pass filters are respectively signals B and C of FIG. 7b. As can be readily seen, the sum of signals B and C are at all times equal to the heading change input signal. Assuming the pointer and ring rotate equal amounts when the same input signal is applied to their respective servos, the combined rotations of the ring and pointer will always be in proportion to the input signal and therefore the pointer will always point to the true craft heading.

The apparatus of FIG. 6 is, like the apparatus of FIGS. 1 and 2, redundant. However, unless some means is provided by bypassing the filters in the event one of the servos fails, the display will be either an inside-out type display of only long term heading changes (if the pointer servo fails), or an outside-in type display of only short term heading changes (if the ring servo fails).

As shown in FIG. 8, the indicator of FIG. 4 may be modified, if desired, so that signals representing short term heading information drive a ring 36', having a pointer 37 thereon, which is rotatable coaxially with a rotatable disc 32' marked with indicia representing the heading of the craft. As shown, the indicator of FIG. 8 is provided with a marker 39 and, like the device of FIG. 4, a ball bank indicator 41 for displaying turn and bank information. The ring and disc are driven, respectively, by shafts 38 and 28. Operation of the device of FIG. 8 is identical to that of FIG. 4 with the pointer 37 always indicating the true craft heading on the disc 32' and the pointer 39 the Referring to FIG. 9, an aircraft horizon indicator operable with apparatus embodying the invention is shown comprising a rotatable background 96 and horizon reference 97, and a rotatable miniature airplane 98. With a signal representing aircraft bank applied to the comparison circuit 10 of FIG. 1 instead of a heading signal, and with the background 96 and airplane 98 driven respectively by shafts 28 and 38 in place of the ring 32 and pointer 36, short term bank signals will operate to rotate the airplane 98 and long term bank signals will operate to rotate the background 96. Referring to FIG. 10a, a roll of the aircraft will cause the airplane 98 to rotate (as shown) immediately relative to the horizon reference 97, thereby indicating that the pilot is banking his craft. If the pilot holds the craft in a bank, the background 96 and horizon reference will be driven eventually to the position shown in FIG. 10b, with the airplane 98 gradually assuming its reference position to provide a display of the long term attitude of the craft.

Like bank information, altitude, speed, etc. may be displayed by apparatus embodying the invention. For example, by applying a signal representing the altitude of an aircraft to the comparison circuit 10 of FIG. 1 and calibrating the ring 32 in units of altitude, long and short term altitude conditions may be displayed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Indicating apparatus comprising first and second servo means, said first and second servo means each being adapted to receive an input signal simultaneously and being each adapted to be responsive respectively to long and short term components of the signal, means providing a reference index, said means providing a reference index being coupled to be driven in one sense by said first servo means, and marker means movable relative to said reference index coupled to be driven in an opposite sense to that of said means providing reference index by said second servo means, whereby said movable marker means position relative to said reference index is an indication of the instantaneous value of said input signal.

2. Indicating apparatus comprising first servo means adapted to be responsive to signals representing substantially long term variations of a function, second servo means adapted to be responsive to signals representing substantially short term variations of that function, means applying an input signal representing that function simultaneously to said first and second servo means, said first and second servo means responding respectively to long and short term components of the input signal, index means coupled to be driven by said first servo means in one sense, and means having a marker, said last-named means being coupled to be driven relative to said index by said second servo means in an opposite sense.

3. Indicating apparatus comprising means providing a movable background, means movable relative to said background, first and second servo means being respectively adapted to be responsive to substantially long and short term input signals, said first and second servo means being respectively connected to said means providing a background and said means movable relative to said background to move the background and the movable means in counter directions, and means applying an input signal to said first and second servo means.

4. Indicating apparatus comprising movable means providing a reference, marker means movable relative to said reference, first differential means adapted to receive an applied signal, a first servo adapted to be responsive only to substantially long term signals, said first servo being connected to said movable means providing a reference to move said movable means in one sense, means providing a feedback signal from the output of said servo to said first differential means, second differential means, said first differential means output signal being applied to said first servo and said second differential means, a second servo connected to said marker means movable relative to said reference to move that means in a sense counter to the sense that said means providing a reference moves, and means providing a feedback signal from the output of said second servo to said second differential means, said second differential means output signal being applied to said second servo.

5. Heading indicating apparatus comprising a movable scale, pointing means movable with respect to the face of said scale, first and second servo means respectively connected to said scale and pointing means and being respectively adapted to be responsive to long and short term input signals to move respectively the scale and pointing means in opposite directions, and means applying a heading signal simultaneously to said first and second servo means.

6. Heading indicating apparatus comprising a rotatable dial, pointing means rotatable coaxially with said dial, first and second servo means respectively connected to said dial and pointing means and being respectively adapted to be responsive to long and short terms input signals to rotate said dial and pointing means in opposite directions, and means applying a heading signal simultaneously to both said servo means.

7. Heading indicating apparatus comprising first differential means adapted to receive a signal representing the heading of a craft, first servo means adapted to be responsive only to signals representing substantially long term heading changes, a movable scale connected to and driven by said first servo means, feedback means applying a signal representing the output of said servo means to said first differential means, second differential means, said first differential means output signal being applied to said first servo means and to said second differential means, second servo means receiving and being counter-driven by the output signal from said second differential means, movable pointer means connected to and driven by said second servo means, and feedback means applying a signal representing said second servo means output to said second differential means.

8. Indicating apparatus for a vehicle comprising first and second servo means, said first and second servo means each being adapted to receive an input signal simultaneously and being each adapted to be responsive respectively to long and short term components of the signal, said signal representing the attitude of said vehicle, movable means providing a reference, said movable means being driven in one sense by said first servo means, marker means movable relative to said means providing a reference driven in a sense opposite to the sense that said movable means is driven by said second servo means, immovable means providing an index, and means connected to said first servo means for manually positioning said means providing a reference relative to said index and locking said means providing a reference in place, whereby the displacement between the reference and said index indicates a desired attitude and the displacement between the marker means and said index indicates the actual attitude of said vehicle.

9. Heading indicating apparatus comprising a rotatable dial, pointing means rotatable coaxially with said dial, first and second servo means respectively connected to said dial and pointing means and being respectively adapted to be responsive to long and short term input signals to rotate said dial and pointing means in opposite directions, means applying a heading signal simultaneously to both said servo means, means providing an index, and clutch means connected to said first servo means for manually rotating said dial relative to said index and locking said dial in place, whereby said pointing means indicates true heading and the displacement between said pointing means and said index represents a heading error from a course indicated by said index.

10. Indicating apparatus comprising differential means, first and second servo means receiving a signal from said differential means, said differential means receiving a feedback signal from the output of said first servo means and an input signal, means damping said first servo means more than said second servo means, means providing a reference driven in one sense by said first servo means and movable marker means driven in a sense opposite to that of said reference by said second servo means.

11. Apparatus for indicating the heading of a vehicle comprising differential means, first and second servo means receiving a signal from said differential means, said differential means having a signal representing the heading of said vehicle and a feedback signal from said first servo means applied thereto, means damping the operation of said first servo means more than said second servo means, a reference dial rotatably driven in one direction by said first servo means, and pointing means rotatably driven by said said second servo means in an opposite direction, said pointing means indicating on said reference dial the true heading of the vehicle.

12. Apparatus for indicating the heading of a vehicle comprising differential means, first and second servo means receiving a signal from said differential means, said differential means having a signal representing the heading of said vehicle and a feedback signal from said first servo means applied thereto, means damping the operation of said first servo means more than said second servo means, a reference dial rotatably driven in one direction by said first servo means, pointing means rotatably driven by said second servo means in an opposite direction, said pointing means indicating on said reference dial the true heading of the vehicle, means secured to said apparatus providing a first index, and means for manually varying the rotational position of said reference dial relative to said index and locking said dial in place, whereby said pointing means indicates the true heading of the craft on the dial and the index indicates a selected heading.

References Cited by the Examiner

UNITED STATES PATENTS

| 2,634,067 | 4/53 | McCoy, et al. | 244—77 |
| 2,823,378 | 2/58 | Reedy et al. | 73—178 X |
| 2,847,668 | 8/58 | Calvert | 340—27 X |
| 2,852,724 | 9/58 | Bargen | 318—19 |
| 2,932,024 | 4/60 | Sant Angelo | 73—178 X |

NEIL C. READ, *Primary Examiner.*

NATHAN KAUFMAN, *Examiner.*